United States Patent
Haensli et al.

(10) Patent No.: US 11,408,545 B2
(45) Date of Patent: Aug. 9, 2022

(54) CLAMPING CLIP

(71) Applicant: Oetiker Schweiz AG, Horgen (CH)

(72) Inventors: Willi Haensli, Horgen (CH); Rolf Deller, Thalwil (CH); Steffen Richter, Schlieren (CH)

(73) Assignee: Oeitker Schweiz AG, Horgen (CH)

( * ) Notice: Subject to any disclaimer, the term of this patent is extended or adjusted under 35 U.S.C. 154(b) by 0 days.

(21) Appl. No.: 17/024,143

(22) Filed: Sep. 17, 2020

(65) Prior Publication Data
US 2021/0003235 A1    Jan. 7, 2021

Related U.S. Application Data

(63) Continuation of application No. 16/346,573, filed as application No. PCT/EP2017/067357 on Jul. 11, 2017, now abandoned, which is a continuation of application No. PCT/EP2016/076366, filed on Nov. 2, 2016.

(51) Int. Cl.
F16L 33/035    (2006.01)

(52) U.S. Cl.
CPC ........... *F16L 33/035* (2013.01); *Y10T 24/148* (2015.01)

(58) Field of Classification Search
CPC ............... Y10T 24/148; Y10T 24/1482; Y10T 24/1457; F16L 33/035; F16L 33/03
See application file for complete search history.

(56) References Cited

U.S. PATENT DOCUMENTS

| | | | |
|---|---|---|---|
| 3,605,200 A * | 9/1971 | Vallinotto et al. | F16L 3/12 24/20 TT |
| 4,128,918 A * | 12/1978 | Wenk | F16L 33/035 24/16 R |
| 4,214,351 A * | 7/1980 | Wenk | F16L 33/035 24/16 PB |
| 4,425,681 A | 1/1984 | Ilius | |
| 4,901,404 A | 2/1990 | Mizukoshi et al. | |
| 5,191,683 A | 3/1993 | Ojima et al. | |
| 5,855,044 A | 1/1999 | Cradduck | |
| 6,192,555 B1 | 2/2001 | Nakamura et al. | |
| 6,343,407 B1 | 2/2002 | Muto et al. | |

(Continued)

FOREIGN PATENT DOCUMENTS

| | | |
|---|---|---|
| CN | 101460774 | 6/2009 |
| JP | H09-310792 | 12/1997 |

(Continued)

*Primary Examiner* — Robert Sandy
*Assistant Examiner* — Michael S Lee
(74) *Attorney, Agent, or Firm* — Simpson & Simpson, PLLC

(57) ABSTRACT

A clamping clip, including a clamping band the two end portions of which overlap one another in a closed condition of the clamping clip forming an inner band portion and an outer band portion, the clamping band including a first tensioning hook arranged on the outer band portion, and a second tensioning hook arranged on the inner band portion, the second tensioning hook including an inclined surface facing the outer band portion as a ramp, wherein at least one of the first tensioning hook and the second tensioning hook includes a plurality of projections facing away from the other of the first tensioning hook and the second tensioning hook.

2 Claims, 3 Drawing Sheets

(56) References Cited

U.S. PATENT DOCUMENTS

| | | | |
|---|---|---|---|
| 7,093,326 B2 | 8/2006 | Oetiker et al. | |
| 2003/0084548 A1 | 5/2003 | Nakamura | |
| 2004/0134041 A1* | 7/2004 | Craig, Jr. | F16L 33/035 24/20 CW |
| 2008/0011907 A1* | 1/2008 | Jacobsma | F16L 33/035 248/62 |
| 2009/0151133 A1 | 6/2009 | Zhang | |
| 2009/0172924 A1 | 7/2009 | It et al. | |
| 2009/0313792 A1 | 12/2009 | Guillaume et al. | |
| 2014/0331458 A1* | 11/2014 | Ozawa | B21D 53/36 24/270 |
| 2015/0267848 A1 | 9/2015 | Zaharis | |

FOREIGN PATENT DOCUMENTS

| | | |
|---|---|---|
| JP | 2002-048282 | 2/2002 |
| JP | 2005-030528 | 2/2005 |
| JP | 2005-261873 | 9/2005 |
| JP | 2015-183809 | 10/2015 |
| KR | 200455752 | 9/2011 |
| KR | 101380212 | 4/2014 |
| RU | 2622342 | 6/2017 |
| WO | WO2000/075552 | 12/2000 |
| WO | WO2009/152832 | 12/2009 |

\* cited by examiner

CLAMPING CLIP

CROSS-REFERENCE TO RELATED APPLICATIONS

The present application filed under 35 U.S.C. § 120 as a continuation of U.S. patent application Ser. No. 16/346,573, filed on May 1, 2019, which application is the U.S. National Stage Application pursuant to 35 U.S.C. § 371 of International Patent Application No. PCT/EP2017/067357, filed on Jul. 11, 2017, which application claims priority to International Patent Application No. PCT/EP2016/076366, filed on Nov. 2, 2016, which applications are incorporated herein by reference in their entireties.

FIELD

The present disclosure relates to clamping clips, and more particularly, to clamping clips with a stepless inner surface.

BACKGROUND

KR 20-0455752 Y1 discloses a clamping clip made of a clamping band, the two end portions of which overlap each other in the closed condition of the clamping clip. The overlapped inner band portion is tapered and engages in a complementarily shaped tongue channel provided on the overlapping outer band portion. In another clamping clip known from KR 10-1380212 B1, the tongue and the tongue channel have an oblong shape. In both cases the tongue and the tongue channel effect a mutual centering.

With known clamping clips, radial installation requires the band ends to be unhooked from a typically provided pre-positioning. This is not easy because the known clamps are not designed for this. In addition, there is a chance with known stepless clamping clips that steplessness is no longer given after a radial installation because the tongue does not come to lie correctly in the tongue channel.

SUMMARY

According to aspects illustrated herein, there is provided a clamping clip, comprising a clamping band the two end portions of which overlap one another in a closed condition of the clamping clip forming an inner band portion and an outer band portion, the clamping band including a first tensioning hook arranged on the outer band portion, a second tensioning hook arranged on the inner band portion, the second tensioning hook including an inclined surface facing the outer band portion as a ramp, a plurality of projections arranged on the at least one tensioning hook, wherein at least one of the first tensioning hook and the second tensioning hook includes a plurality of projections facing away from the other of the first tensioning hook and the second tensioning hook.

In some embodiments, the clamping clip further comprises a tongue arranged at the overlapped inner band portion, and a tongue channel arranged in the overlapping outer band portion, the tongue channel being complementary to the shape of the tongue for receiving the tongue, wherein the tongue includes a root part that decreases in width from a first width to a second width, the second width being less than the first width, and an end part adjoining the root part, the end part including a third width equal to the second width. In some embodiments, the inner band portion comprises a connecting hook including a projection, and the outer band portion comprises an end and an inclined surface arranged at the end, the inclined surface including a centering groove operatively arranged to cooperate with the projection. In some embodiments, an end part of the outer band portion is bent outward. In some embodiments, the outer band portion comprises an inward projecting point bead. In some embodiments, a connecting hook is provided on the inner band portion for engagement in the first tensioning hook. In some embodiments, a band region at least partially aligned with the inner band portion includes a radially outward projecting tolerance compensating wave. In some embodiments, the tolerance compensating wave is curved in an axial direction such that its outer edges abut against an object to be clamped in a tightened condition of the clamping clip. In some embodiments, the inner band portion comprises a first radially outward curved band portion, the outer band portion comprises a second radially outward curved band portion, the second radially outward curved band portion operatively arranged to engage the first radially outward curved band portion in the closed condition of the clamping clip, and the outer band portion comprises an opening hook on a first side of the second radially outward curved band portion. In some embodiments, an outer height of the first radially outward curved band portion is greater than a clear height of the second radially outward curved band portion. In some embodiments, the opening hook comprises one or more projections which face away from an end of the outer band portion.

According to aspects illustrated herein, there is provided a clamping clip comprising a clamping band the two end portions of which overlap one another in a closed condition of the clamping clip, the clamping band including a tongue arranged at an overlapped inner band portion, and a tongue channel arranged in an overlapping outer band portion, the tongue channel being complementary to the shape of the tongue for receiving the tongue, wherein the tongue includes a root part that decreases in width from a first width to a second width, the second width being less than the first width, and an end part adjoining the root part, the end part having a to third width equal to the second width.

In some embodiments, a tensioning hook is arranged on the overlapping outer band portion. In some embodiments, a tensioning hook is arranged on the overlapping inner band portion. In some embodiments, the tensioning hook comprises an inclined surface facing the outer band portion as a ramp. In some embodiments, the inclined surface comprises a centering groove operatively arranged to engage with a projection on a connecting hook. In some embodiments, an end part of the overlapping outer band portion is bent outward. In some embodiments, the overlapping outer band portion comprises an inward projecting point bead. In some embodiments, the overlapping inner band portion comprises a connecting hook, the overlapping outer band portion comprises a tensioning hook, and the connecting hook is operatively arranged to engage the tensioning hook. In some embodiments, a band region at least partially aligned with the overlapping inner band portion comprises a radially outward projecting tolerance compensating wave. In some embodiments, the tolerance compensating wave is curved in an axial direction in such a way that its outer edges abut against an object to be clamped in a tightened condition of the clamping clip. In some embodiments, the clamping clip further comprises a tensioning hook on at least one of the overlapping inner band portion and the overlapping outer band portion. In some embodiments, the tensioning hook comprises at least one projection facing in a circumferential direction relative to the clamping band. In some embodiments, the tensioning hook comprises three projections facing in a circumferential direction relative to the clamping band. In some embodiments, the overlapping inner band portion comprises a first radially outward curved band portion, the overlapping outer band portion comprises a second radially outward curved band portion, the second radially outward curved band portion operatively arranged to engage the first radially outward curved band portion in the closed condition of the clamping clip, and the overlapping outer band portion comprises an opening hook on a first side of the second radially outward curved band portion. In some embodiments, the first side is opposite a second side of the second radially outward curved band portion, the second side being in closer proximity to an end of the overlapping outer band portion than the first side. In some embodiments, an outer height of the first radially outward curved band portion is greater than a clear height of the second radially outward curved band portion. In some embodiments, the opening hook comprises one or more projections which face away from an end of the overlapping outer band portion.

It is the object of the invention is to provide a clamping clip with a stepless inner surface that can be mounted both axially and radially in a simpler and safer manner.

This object is achieved with the present invention. The clamping clip formed in accordance with the invention is not pre-positioned and therefore does not require the band ends to be unhooked for radial installation. The invention ensures the desired steplessness after radial installation. At the same time, it ensures that after any deformation of the clamping clip, e.g., during shipping and handling, the tongue is guided positively and safely into the tongue channel when the clamping clip is closed by means of a pair of pliers.

The shape of the tensioning hooks described below allows the clamping clip of the invention to be closed and re-opened with commercially available pliers. Furthermore, the clamping clip of the invention is reusable.

In a further development of the invention, the clamping clip is provided with a tolerance compensation so that it can be mounted also on hard to non-compressible materials.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
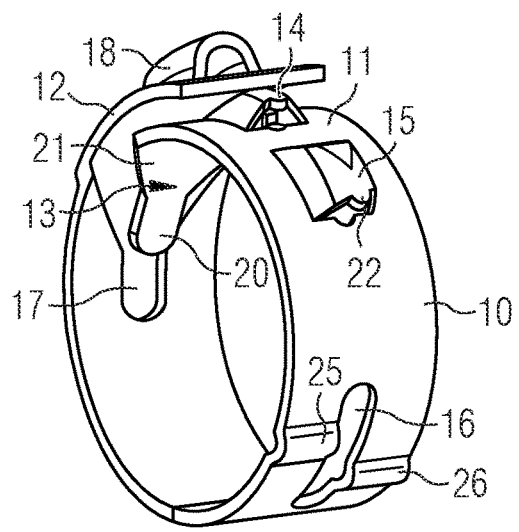
FIG. 1 is a perspective representation of a clamping clip in the open condition.
Figure 2:
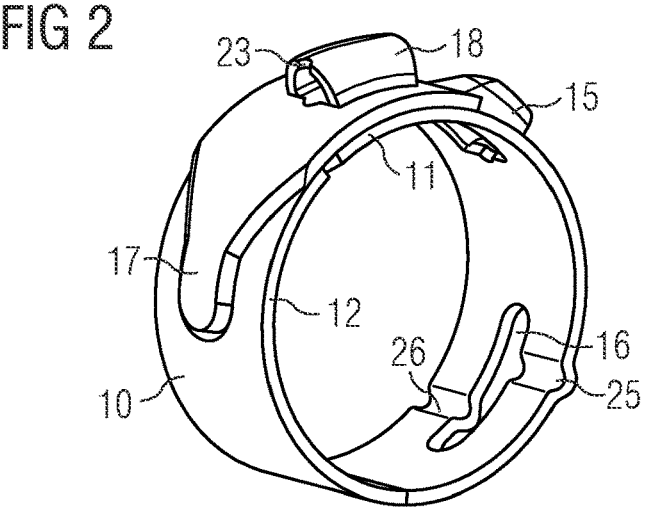
FIGS. 2 and 3 show the clamping clip of FIG. 1 in a closed and tightened condition, seen from two different directions.
Figure 3:
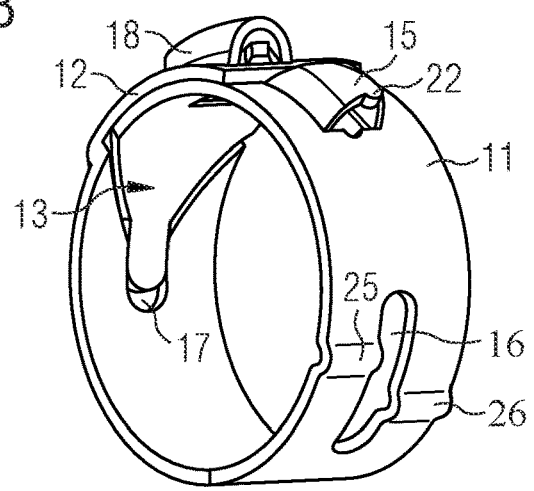

The clamping clip shown in FIGS. 1-3 consists of clamping band 10 with overlapping band portions 11 and 12. Starting from band portion 11 which is the inner one in the overlapping area, clamping band 10 includes the following parts: tongue 13, inner connecting hook 14 projecting from the outside of clamping band 10, tension hook 15 also projecting outward, slot 16 extending in the circumferential direction of the clamping clip, tongue channel 17 formed on the inner side of clamping band 10, and outward projecting outer tension hook 18.

Tongue 13 has end part 20, which is narrower than the full band width and has parallel side edges and a rounded tip, and trapezoidal root part 21 which increases in width from end part 20 to the full width of the clamping band. Tongue channel 17 has a shape complementary to tongue 13.

It has been found that the described geometry of tongue 13 and tongue channel 17 with a conical root part 21 in combination with subsequent straight end part 20 leads to a very safe automatic centering and thus to the desired stepless inner surface of the clamping clip. The safe centering is achieved in particular by conical root part 21 and the steplessness is achieved in particular by straight end part 20.

In the closed condition of the clamping clip shown in FIGS. 2 and 3, connecting hook 14 (not visible here) engages in tensioning hook 18. To close and tighten the clamping clip, the clip can be gripped with universal pliers, which engage the ends of two tensioning hooks 15 and 18 facing away from each other. At these ends, tensioning hooks 15, 18 each have nose 22, 23 projecting in the circumferential direction to prevent the pliers from slipping off.

Waves 25, 26 are stamped into the band parts between slot 16 and the respective outer edge of clamping band 10, which waves compensate for tolerances between the circumference of the clamping clip and the respective object to be clamped. Waves 25, 26 are offset from each other in the circumferential direction in order to achieve a 360° all-round support without interruptions in the inner surface of the clamping clip.

Figure 4:
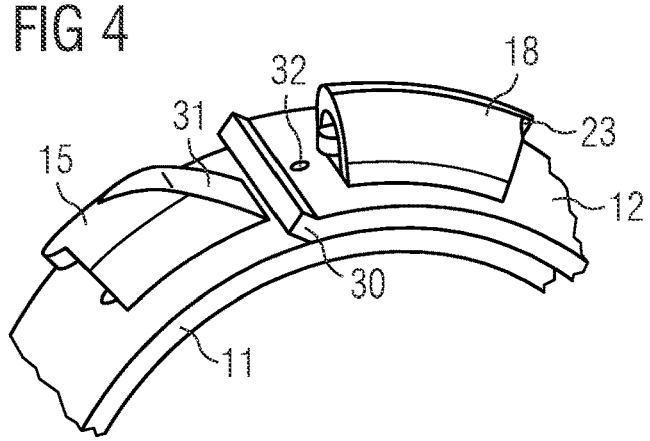
FIG. 4 is a partial view of the clamping clip of an alternative embodiment in the closed condition.

With the design according to FIG. 4 end part 30 of outer band portion 12 is bent and runs diagonally outwards at an angle. Tensioning hook 15 is provided with inclined surface 31 facing end part 30, which serves as a ramp for end part 30 when closing and tightening the clamping clip.

Between end part 30 and tensioning hook 18, inwardly projecting point bead 32 is stamped into clamping band 10, which reduces the friction between outer band portion 12 and inclined surface 31 and simultaneously stiffens outer band portion 12 against deformation.

The shape of tensioning hooks 15 and 18 with noses 22 and 23 and the formation of inclined surface 31 on tensioning hook 15 in conjunction with point shaped bead 32 and bent end part 30 on outer band portion 12 ensure the reusability of the clamping clip.

In the embodiment of FIGS. 1-3, the clamping clip is provided with a tolerance compensation in the form of waves 25, 26. This measure is not necessary with every clamping clip; it can be useful depending on the properties of the object to be clamped.

Figure 5:
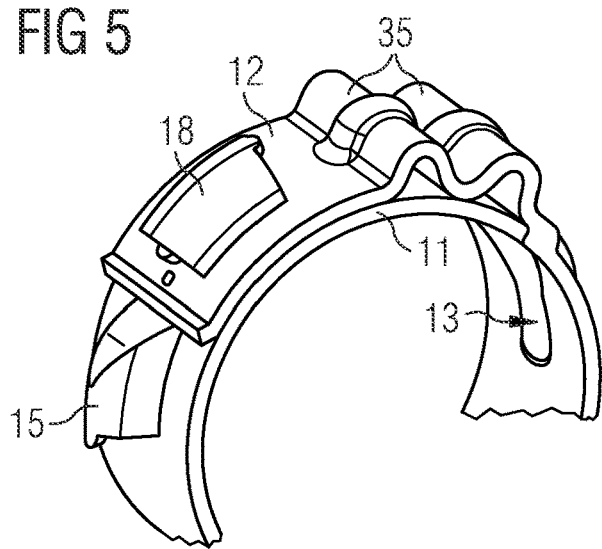
FIGS. 5 and 6 are partial views of further embodiments of the clamping clip, each in the closed condition.

In the embodiment of FIG. 5, the clamping clip is equipped with tolerance compensating waves 35 which, unlike in FIG. 2, extend over the entire width of clamping band 10 but lie within an area supported by inner clamping band portion 11. This feature results in easier deformability of the clamping clip for softer objects to be clamped.

Figure 6:
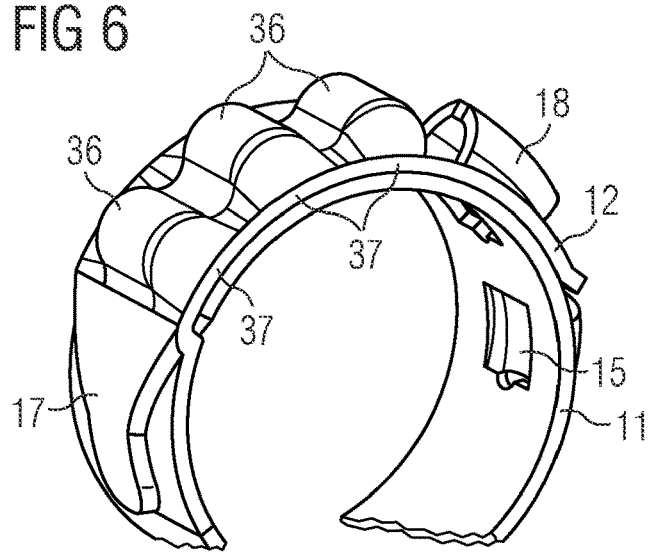

In the further embodiment of FIG. 6, several tolerance compensating waves 36 are provided which again extend over the entire width of clamping band 10 and are curved in the radial direction in such a way that their outer edges 37 lie close to the object to be clamped in the tightened condition of the clamping clip. This avoids the risk of damage to elastomer materials, such as bellows, in the event of contact during component rotation. At the same time, the clamping clip is protected against contamination, which in extreme cases can impair the tolerance compensation.

Figure 7:
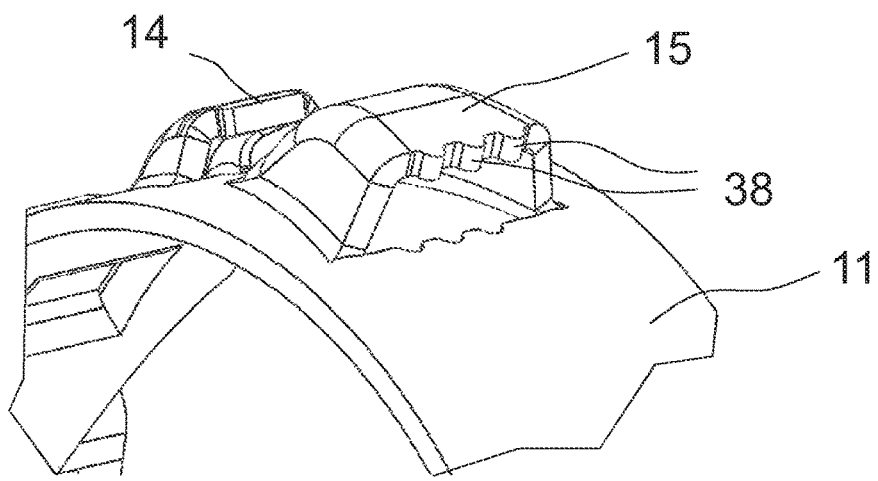
FIG. 7 is a partial view of the clamping clip according to another embodiment.

As shown in FIG. 7, tensioning hook 15 arranged on the inner band portion 11 can have several, preferably three, projections 38 facing away from the inner end of the band, which ensure a secure gripping of the plier tool used for closing the clamping clip and thus a secure closing. A single projection would not only be more susceptible to breakage, but could also lead to a rotation of the plier jaw.

In the same way, tensioning hook 18 arranged on outer band portion 12 can be provided with several, preferably three, projections 39 on its plier engaging edge remote from the outer band end.

Figure 8:
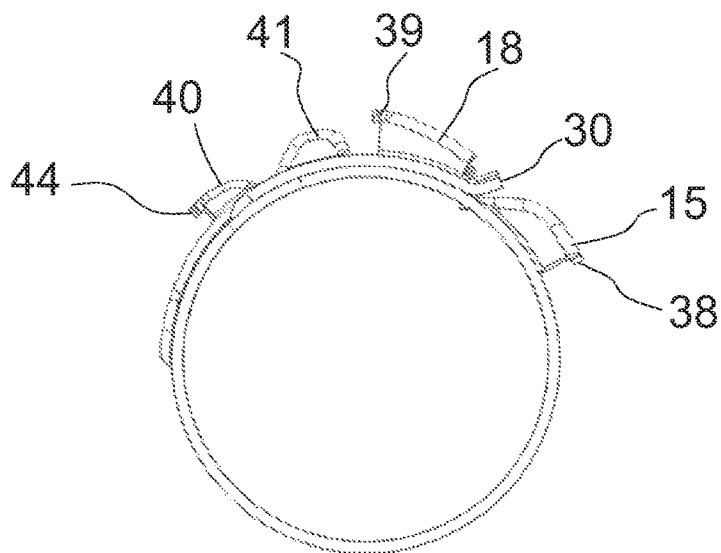
FIGS. 8 and 9 are a side view and a perspective view of the clamping clip according to further modifications.
Figure 9:
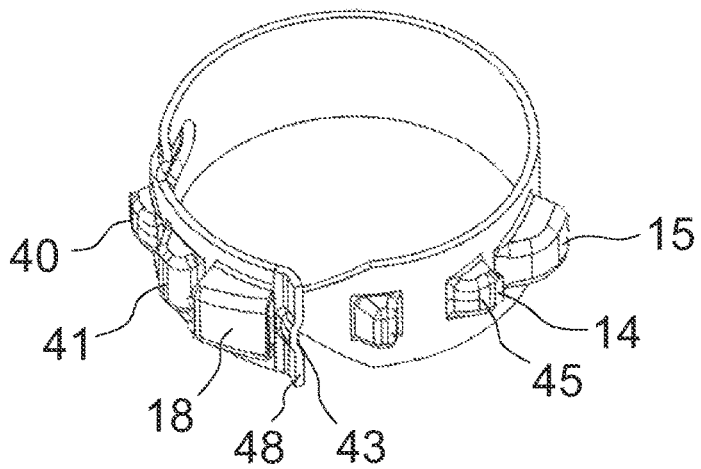

According to FIGS. 8 and 9, opening hook 40 is arranged on the side of outer band portion 12 remote from the outer end of the band. The closed clamping clip can be opened by means of a plier tool engaging tensioning hook 15 and opening hook 40. The opening process is assisted by curved band portion 41, which is arranged between opening hook 40 and tensioning hook 18 on outer band portion 12 and in which a second curved band portion formed on inner band portion 11 engages when the band clamping clip is closed.

The second curved band portion is omitted from the drawing. Its outer height is greater than the clear height of curved band portion 41 arranged on outer band portion 12. The difference in height results in a bias which favorably affects the opening process. Furthermore, the inner surface of curved band portion 41 facing the outer end of the band is formed as a ramp.

The outer edge of opening hook 40, which serves to engage the pliers, may be provided with several, preferably three, projections 44 similar to the edge of tensioning hook 15.

In the embodiment of FIG. 9, inclined surface 48 with centering groove 43 is formed at the end of outer band portion 12 which is longer than in FIG. 4. Projection 45 formed on connecting hook 14 engages in this groove when the clamping clip is closed in order to prevent misalignment of the clamping clip. Centering groove 43 also serves to reinforce inclined surface 48 in order to prevent its deformation during the closing movement.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Clamping band
11 Inner clamping band portion
12 Outer clamping band portion
13 Tongue
14 Connecting hook
15 Tensioning hook
16 Slot
17 Tongue channel
18 Tensioning hook
20 End part of 13
21 Root part
22 Nose at 15
23 Nose at 18
25, 26 Tolerance compensating waves
30 End part of 12
31 Inclined surface
32 Point shaped bead
35, 36 Tolerance compensating waves
37 Outer edge
38, 39 Projections
40 Opening hook
41 Curved tape portion
43 Centering groove
44, 45 Projections
48 Inclined surface

What is claimed is:

1. A clamping clip, comprising:
a clamping band two end portions of which overlap one another in a closed condition of the clamping clip forming an inner band portion and an outer band portion, the clamping band including:
a first tensioning hook arranged on the outer band portion; and,
a second tensioning hook arranged on the inner band portion, the second tensioning hook including an inclined surface facing the outer band portion as a ramp;
wherein:
a connecting hook is provided on the inner band portion for engagement in the first tensioning hook;
at least one of the first tensioning hook and the second tensioning hook includes a plurality of projections facing away from the other of the first tensioning hook and the second tensioning hook; and,
the plurality of projections are arranged adjacent to each other along a width of the clamping band.

2. The clamping clip as recited in claim 1, further comprising:
   a tongue arranged at the overlapped inner band portion; and,
   a tongue channel arranged in the overlapping outer band portion, the tongue channel being complementary to the shape of the tongue for receiving the tongue, wherein the tongue includes:
      a root part that decreases in width from a first width to a second width, the second width being less than the first width; and,
      an end part adjoining the root part, the end part including a third width equal to the second width.

\* \* \* \* \*